(12) United States Patent
Themelis

(10) Patent No.: US 11,048,097 B2
(45) Date of Patent: Jun. 29, 2021

(54) MULTIPLE BAND PASS LIQUID CRYSTAL TUNABLE FILTER

(71) Applicant: LEICA INSTRUMENTS (SINGAPORE) PTE. LTD., Singapore (SG)

(72) Inventor: George Themelis, Lindau (DE)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 15/947,782

(22) Filed: Apr. 7, 2018

(65) Prior Publication Data

US 2018/0292706 A1   Oct. 11, 2018

(30) Foreign Application Priority Data

Apr. 11, 2017 (EP) .................................... 17166085

(51) Int. Cl.
*G02B 5/30* (2006.01)
*G02B 27/28* (2006.01)
(Continued)

(52) U.S. Cl.
CPC ............ *G02B 27/28* (2013.01); *G01J 3/2803* (2013.01); *G01J 3/2823* (2013.01); *G01J 3/36* (2013.01);
(Continued)

(58) Field of Classification Search
CPC ......... G02F 1/133514; G02F 1/133528; G02F 1/133512; G02F 1/167; G02F 1/133516;
(Continued)

(56) References Cited

U.S. PATENT DOCUMENTS 7,630,022 B1    12/2009   Baur et al.
9,880,094 B2 *   1/2018   Wolowelsky ...... G01N 21/3504
(Continued)

*Primary Examiner* — Darryl J Collins
*Assistant Examiner* — Tamara Y. Washington
(74) *Attorney, Agent, or Firm* — Hodgson Russ LLP

(57) ABSTRACT

The invention relates to an optical filter (1) for transmitting light (13) of a pass wavelength (17), comprising at least two optical filter stages (3) arranged along a transmission direction (11), along which the light (13) of the pass wavelength (17) is transmitted through the optical filter (1), wherein each of the at least two optical filter stages (3) comprises at least one entrance polarizing element (5) and at least one constant retarding element (7). The invention further relates to a camera (53) for simultaneously capturing at least two images, wherein each image is limited to light (13) in a limited spectral band (44) and to a multi-spectral imaging system (87) and an illumination system (73) applying the inventive optical filter (1). Solutions of the art have low peak transmission values and may furthermore only provide monochrome images in real time. The present invention improves optical filters (1) of the art by each of the at least two optical filter stages (3) comprising a periodic transmission characteristic (35) that extends over a working wavelength range (41), wherein each transmission characteristic (35) comprises at least two peaks (43c-43e), which each overlap at least one peak (43c-43d) of each of the other transmission characteristics (35) and wherein an overall transmission characteristic (29) of the optical filter (1) comprises at least two spectral passbands (45) that are spectrally separated from each other. The inventive camera (53), multi-spectral imaging system (87) and inventive illumination system (73) apply an optical filter (1) according to the invention.

11 Claims, 4 Drawing Sheets

(51) Int. Cl.
   *H04N 5/225* (2006.01)
   *G01J 3/28* (2006.01)
   *G01J 3/36* (2006.01)
   *G02F 1/1335* (2006.01)
   *G01N 21/25* (2006.01)
   *G01N 21/31* (2006.01)

(52) U.S. Cl.
   CPC .............. *G02B 5/30* (2013.01); *G02B 27/288* (2013.01); *H04N 5/2254* (2013.01); *G01N 21/255* (2013.01); *G01N 21/31* (2013.01); *G02F 1/133514* (2013.01)

(58) Field of Classification Search
   CPC .......... G02F 2001/13312; G02F 2001/133388; G02B 5/201; G02B 5/3033; G02B 5/3083; G02B 5/3025; G02B 1/11; G02B 5/30; G02B 527/28
   USPC ..................................................... 359/491.01
   See application file for complete search history.

(56) References Cited

U.S. PATENT DOCUMENTS

| | | |
|---|---|---|
| 10,151,634 B2 * | 12/2018 | Abdulhalim ......... G02B 27/286 |
| 2008/0266564 A1 | 10/2008 | Themelis |
| 2010/0265383 A1 | 10/2010 | Iwauchi |
| 2011/0102565 A1 | 5/2011 | Wang et al. |
| 2012/0300143 A1 | 11/2012 | Voigt et al. |
| 2014/0098309 A1 | 4/2014 | Shi et al. |
| 2015/0103229 A1 | 4/2015 | Nozawa |
| 2017/0134704 A1 | 5/2017 | Otsubo et al. |

* cited by examiner

MULTIPLE BAND PASS LIQUID CRYSTAL
TUNABLE FILTER

CROSS REFERENCE TO RELATED APPLICATIONS

This application claims priority of European patent application number 17166085.5 filed Apr. 11, 2017, the entire disclosure of which is incorporated by reference herein.

FIELD OF THE INVENTION

The invention relates to an optical filter for transmitting light of a pass wavelength comprising at least two optical filter stages arranged along a transmission direction, along which the light of the pass wavelength is transmitted through the optical filter, wherein each of the at least two optical filter stages comprises at least one entrance polarizing element and at least one constant retarding element.

The invention further relates to a camera for simultaneously capturing at least two images, wherein each image is limited to light in a limited spectral band, a multi-spectral imaging system and an illumination system.

BACKGROUND OF THE INVENTION

Optical filters based on a multitude of filter stages which each comprise birefringent material are known in the art. Said filter stages may be arranged in a design according to Solc or Lyot. Independent of the configuration used, optical filters of the art show the disadvantage of a low peak transmission value, especially in comparison to conventional fixed-wavelength optical filters. Therefore, if applied in a camera or imaging system, the optical filters of the art require a camera with high sensitivity. In case of illumination systems applying an optical filter of the art, high illumination intensities are required.

SUMMARY AND ADVANTAGES OF THE INVENTION

The object of the present invention is therefore to provide an optical filter, a camera, a multi-spectral imaging system and an illumination system with an improved transmission value.

The optical filter mentioned in the beginning solves the above problem in that each of the at least two optical filter stages comprises a periodic transmission characteristic that extends over a working wavelength range, wherein each transmission characteristic comprises at least two peaks which each overlap with at least one peak of each of the other transmission characteristics and wherein an overall transmission characteristic of the optical filter comprises at least two spectral passbands that are spectrally separated from each other.

The camera of the aforementioned type solves the above problem by comprising an optical filter according to the invention, wherein at least one spectral passband of the filter's overall transmission characteristic is located in each of the spectral bands.

The inventive multi-spectral imaging system for simultaneous imaging solves the above problem by comprising at least one camera according to the invention.

The inventive illumination systems for illuminating a sample with light of at least two different spectral bands solves the above problem by comprising a broadband light source and an optical filter according to the invention.

A pass wavelength is to be understood as a center wavelength of a wavelength-dependent transmission curve, wherein the transmission curve may comprise a specific pulse-like shape.

A pass wavelength is therefore to be understood as the wavelength of maximum transmission of the corresponding optical filter, wherein wavelengths adjacent to the pass wavelengths may also be transmitted, but with a lower transmission than the pass wavelength.

An optical filter stage is to be understood as an assembly of optical components with a wavelength-dependent transmission. The transmission characteristic of each optical filter stage affects the light incident on the optical filter stage along the transmission direction.

The transmission characteristics of all optical filter stages is multiplied in order to obtain the overall transmission characteristic of the optical filter.

The entrance polarizing elements may be embodied as linear polarizers transmitting a pre-determined linear polarization with nearly 100%, wherein light of a polarization differing from the said pre-determined polarization is attenuated by the polarizer.

Light which is perpendicularly polarized with respect to the pre-determined polarization direction is preferably blocked completely. For angles between the incident polarization and the pre-determined polarization direction of the polarizer, the transmission follows a cosine-curve, wherein the negative half-wave of the cosine-curve.

The constant retarding element of each of the optical stages may be embodied as a birefringent material with a fixed birefringence. As birefringence results in a retardation of perpendicularly polarized light components to each other, birefringent materials are also called retarders or retarding elements.

The inventive optical filter comprises at least two optical filter stages, both of which comprise a periodic transmission characteristic extending over the working wavelength range. The working wavelength range is to be understood as a wavelength range within which the optical filter transmits light of the at least one pass wavelength.

The working wavelength range may be limited by individual transmission characteristics of the optical elements applied in the optical filter such as the polarizing elements, the constant retarding element or possible anti-reflection or protective layers comprised in the optical filter.

According to the invention, each of the filter stages comprises a transmission characteristic with at least two peaks within the working wavelength range. The at least two transmission characteristics of the optical filter stages overlap, wherein at least a first and a second transmission maximum of each optical filter stage's transmission characteristics overlaps with at least one transmission maximum of each of the other optical stage's transmission characteristics.

The overall transmission characteristics of the optical filter is obtained by multiplication of the individual transmission characteristics, which, however, only applies in the case of linear light interaction without non-linear effects.

The overall transmission characteristic of the optical filter comprises at least two spectrally-separated spectral passbands, in which light incident on the optical filter will be transmitted with the maximum transmission of the optical filter.

Preferentially, light of any wavelength different than the spectral position of the at least two spectral passbands, in particular a wavelength outside the spectral bandwidth of each of the at least two spectral passbands, is completely blocked by the optical filter. The spectral separation between the at least two spectral passbands preferably amount to at least twice the spectral bandwidth of the spectral passbands.

As the overall transmission characteristic of the optical filter comprises the individual transmission characteristics of the optical filter stages, the spectral bandwidth and the shape of the spectral passbands is identical for all spectral passbands of the optical filter.

Further advantageous embodiments of the invention will be described below. Technical features of the embodiments may be freely combined or omitted.

In one embodiment of the inventive optical filter, the at least two optical filter stages may comprise a similar or even the same individual transmission characteristic, wherein at least one individual transmission characteristic is spectrally shifted with respect to at least another individual transmission characteristic of a second optical filter stage. The resulting spectral passband from overlapping, but shifted individual transmission characteristics may be spectrally narrowed with respect to a spectral passband obtained without the spectral shift of one transmission characteristic.

In a further embodiment of the inventive optical filter, at least three passbands are comprised, wherein the at least three passbands are spectrally equidistantly-spaced from each other in a wavenumber spectrum. The wavenumber is the inverse of the wavelength. The resulting passbands of the optical filter therefore form an optical comb with three or more transmission maxima, defined by the spectral passbands.

The spectral spacing between the passbands may actually be measured between the center wavelengths of the passbands.

It is to be noted that the appearance of the spectral passbands curve, i.e. the passbands bandwidth and peak-to-peak distance may differ between the short and the long wavelength side of the working wavelength range if plotted versus wavelength. If plotted versus the wave number (the inverse of the wavelength), the bandwidth and peak-to-peak distance of the spectral passbands are identical.

In a further advantageous embodiment of the inventive optical filter, at least one of the optical filter stages comprises a variable retarding element for shifting the wavelength-dependent periodic transmission characteristic of the corresponding optical filter stage.

According to this embodiment, at least one of the optical filter stage comprises a constant retarding element introducing a fixed amount of birefringence, i.e. retarding to the incident light and additionally comprises an element introducing a variable birefringence, respectively retardation. Such a variable retardation shifts the wavelength-dependent periodic transmission characteristic along a wavelength axis which results in a possible different spectral position of the overlapping maximum of the at least two individual transmission characteristics, which in turn, shifts the at least two spectral passbands of the optical filter as well.

The optical filter of this embodiment is therefore a tunable multiple band pass filter, which allows transmission of at least two spectral passbands through the filter, wherein the spectral position of the at least two spectral passbands may be varied by a user.

The inventive optical filter may be further improved if each of the optical filter stages comprises a variable retarding element. In this embodiment, all of the periodic individual transmission characteristics of the comprised optical filter stages may be spectrally shifted. Therefore, the position of the overlapping maximum of the periodic transmission characteristics, and consequently the spectral position of the spectral passband may be tuned to nearly any wavelength within the working wavelength range of the optical filter.

The above-mentioned embodiments of the inventive optical filter therefore yield further advantages over prior art optical filters as they allow real time imaging of multiple spectral bands instead of one spectral band of the prior art. This, in turn, results in an accordingly faster scanning speed combined with a better through-put efficiency, i.e. lower losses and lower costs and size.

Prior art optical filters, even tunable filters of the art, may only provide monochrome images in real time. The optical filter of the present invention allows consideration of at least two spectral passbands in real time, i.e. at the same time.

In a further embodiment of the inventive optical filter, at least one of the variable retarding elements is embodied as a liquid crystal element. Liquid crystal elements are based on an isotropic liquid crystals which may be oriented if placed inside an electric field. By variation of the field strength of the electric field, the liquid crystals are rotated and change their birefringence, respectively retardation introduced to light incident on them. The variable retardation introduced by the variable retarding elements may therefore be easily controlled and altered.

In a further embodiment of the inventive optical filter, at least two optical filter stages comprise an identical retardation, wherein the periodic transmission characteristics of the two optical filter stages are shifted against each other. This embodiment of the inventive optical filter has the advantage that the optical bandwidth of the spectral passbands may be varied. Said variation of the bandwidth may be applied alternatively or additionally to the tunability of the spectral passbands of the optical filter. In order to obtain a narrow spectral bandwidth of the spectral passband, more than two optical filter stages may comprise an identical retardation.

The inventive optical filter may be further improved by at least one optical filter stage comprising a retardation which is different than a retardation of at least one other optical filter stage. A different retardation of the constant retarding element results in a different periodicity of the individual transmission characteristics.

When birefringent materials, i.e. crystals are applied, the retardation is increased with the crystal thickness measured along the transmission direction. Therefore, optical filter stages with a thicker constant retarding element may have a transmission characteristic with a decreased periodicity, i.e. an increased spectral frequency of the periodic transmission characteristic. The transmission maxima of the optical filter stage with the thicker constant retarding element are located closer to each other than the transmission maxima of a periodic transmission characteristic of an optical filter stage applying a thinner constant retarding element.

Individual transmission characteristics with low spectral frequencies may comprise a high spectral bandwidth, wherein transmission characteristics with a high spectral frequency may accordingly comprise a smaller spectral bandwidth. The obtained overall transmission characteristic may therefore comprise a spectral bandwidth determined by the spectral bandwidth of the individual transmission characteristic of high spectral frequency, wherein the center wavelength of the spectral passbands may be determined by the transmission maximum of the transmission characteristic of the low spectral frequency.

In a further embodiment of the inventive optical filter, at least one optical filter stage comprises a retardation differing from a retardation of at least one other optical filter stage by a factor of two. A retardation difference by a factor of two results in a spectral frequency of transmission maxima in the corresponding periodic transmission characteristic, which also differs by a factor of two.

Therefore, within one half wave of the transmission characteristic resulting from the lower retardation, preferentially two half waves of the second periodic transmission characteristics resulting from twice the retardation, are comprised.

Thus, an overlap between peaks (transmission maxima) of the at least two periodic transmission characteristics of the optical filter stages with different retardation is guaranteed.

In a further embodiment, a sequence of optical filter stages 1, 2, . . . N may be comprised in the optical filter, wherein the retardation of optical filter stage 2 is twice the retardation of optical filter stage 1, the retardation of optical filter stage 3 is twice the retardation of optical filter stage 2, . . . , and the retardation of optical filter stage N is twice the retardation of optical filter stage N−1.

In this embodiment, the overlap of the transmission maximum of the individual transmission characteristics is also assured. The periodic transmission characteristic of the optical filter stage 1 determines the number of spectral passbands of the optical filter, wherein the number of spectral passbands corresponds to the number of transmission maxima of the periodic transmission characteristic located within the working wavelength range.

Furthermore, the spectral bandwidth of the optical filter stage N may determine the spectral bandwidth of the resulting spectral passbands of the optical filter. Therefore, the optical filter of this embodiment may comprise a spectral comb with at least two spectral passbands, wherein the whole spectral comb may be spectrally shifted by means of the variable retarding elements.

The spectral passbands of the spectral comb may, in particular, be spectrally equidistantly-spaced from each other. The resulting optical filter therefore allows transmission of at least two wavelengths simultaneously, rendering multi-spectral applications in real time possible.

The camera for simultaneously capturing at least two images mentioned in the beginning, may be embodied to detect all transmitted spectral passbands, that is the working wavelength range of the optical filter preferentially corresponds to a camera wavelength range within which the camera is sensitive to incident light. The camera may comprise a detector which may be embodied as a CCD detector or a CMOS detector, wherein each of the detector's pixel may comprise a microfilter.

In a first embodiment of the inventive camera for simultaneously capturing at least two images, the microfilters applied to individual pixels, may be embodied as a band pass filter which only transmits light of a wavelength between a lower wavelength limit and a higher wavelength limit of the corresponding microfilter.

Wavelengths shorter than the lower wavelength limit or longer than the higher wavelength limit are preferentially completely blocked by the microfilter.

The spectral band of a second microfilter may be located spectrally adjacent to the spectral band of the first microfilter, wherein the lower wavelength limit of the second microfilter's band is equal or higher than the higher wavelength limit of the first microfilter's band.

Accordingly, more than two microfilters may be applied to adjacent pixels for defining a color coding. In the case of a red-green-blue (RGB) color coding, a set of three different microfilters may be applied, wherein in case of a green-cyan-magenta-yellow (GCMY) color coding, a set of four different microfilters may be applied to adjacent pixels.

Therefore, the microfilters of the camera may preselect a wavelength range, wherein only one spectral passband of the optical filter is spectrally located within said wavelength range and wherein the spectral passband forms a sub-wavelength range of the filter's spectral band. Therefore, the intensity of the incident light measured with said pixel may unambiguously be related to the intensity of the corresponding spectral passband of the optical filter.

Another possible embodiment of the inventive camera applies microfilters with a distinctive transmission spectrum, wherein the at least two spectral passbands of the optical filter experience different transmission values for each of the microfilters. Said camera further comprises a processor for post-processing in order to relate the measured intensity for each pixel to only one spectral passband.

The multi-spectral imaging system mentioned in the beginning may be further improved by providing at least two cameras, wherein the at least two passbands of each of the at least two cameras are spectrally shifted against each other.

Commonly, multi-spectral imaging systems have the limitation that the spectral distance between the spectral passbands is constant and therefore the passbands may not be selected independently. This embodiment of the inventive multi-spectral imaging system mitigates this limitation as it allows to select the passbands which are measured by each camera independently.

For the inventive illumination system as mentioned in the beginning, a continuous broadband light source or a discrete broadband light source may be applied. The illumination system therefore filters the at least two different spectral passbands for illuminating a sample with said at least two passbands.

It is conceivable that filtering a discrete broadband light source may be applied for obtaining selected spectral passbands. Said passbands may be tuned to illumination wavelengths corresponding to individual absorption features of a sample. Consequently, excitation of a fluorescence at two different fluorescence channels may be possible.

BRIEF DESCRIPTION OF THE DRAWING VIEWS

In the following, the invention will be described with reference to the accompanying drawings. The same technical features and features with the same technical effect will be provided with the same reference numeral.

In the following:

DETAILED DESCRIPTION OF THE INVENTION

Figure 1:
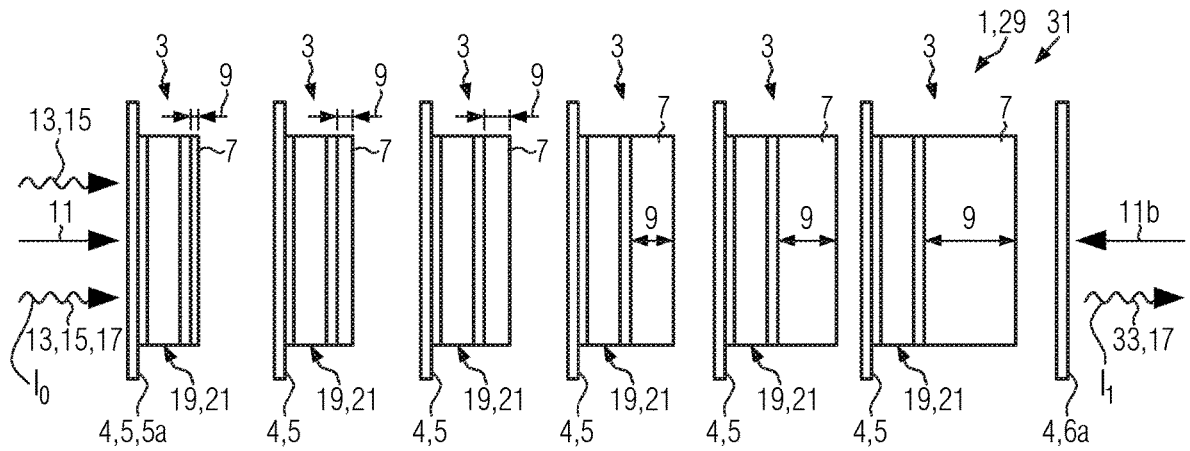
FIG. 1 shows a schematic set-up of an optical filter of the art.

FIG. 1 shows a schematic working principle of an optical filter 1 of the art. The optical filter 1 comprises, six optical filter stages 3 in the embodiment shown, wherein each of the optical filter stages 3 comprises an entrance polarizing element 5 and one constant retarding element 7 which yields an increasing thickness 9 from the left optical filter stage to the optical filter stage 3 at the right side of FIG. 1.

Furthermore, each optical filter stage 3 comprises a variable retarding element 19 which is embodied as a liquid crystal element 21. Each liquid crystal element 21 comprises a liquid crystal 23 provided in between two glass plates 25 provided with optically transmissive electrodes 27. The liquid crystal 23, the glass plates 25 and electrically transmissive electrodes 27 are indicated by reference numerals only for the left optical filter stage 3.

Each optical filter stage 3 comprises two polarizing elements which are oriented such that linearly polarized light passing through the first of the two polarizing elements is oriented perpendicularly to light transmitted through the second of the two polarizing elements 4.

In the set-up shown in FIG. 1, the entrance polarizing element 5 represents an output polarizing element 6 for the optical filters stage 3 located left to the corresponding entrance polarizing element 5.

The entrance polarizing element 5 of the optical filter stage 3 located at the left side of FIG. 1 represents an overall entrance polarizing element 5a and the optical filter 1 further comprises an overall output polarizing element 6a which does not represent an entrance polarizing element 5.

FIG. 1 also shows a transmission direction 11 and as transmission through the optical filter 1 shown in FIG. 1 effects light 13 travelling in the transmission direction 11 or opposite the transmission direction 11 identically, an alternative transmission direction 11b is also shown in FIG. 1.

The light 13 entering the optical filter 1 in transmission direction 11 has a wavelength 15 which is a pass wavelength 17 in FIG. 1.

The optical filter 1 has an overall transmission characteristic 29, which is characterized by a maximum transmissivity 31 for the pass wavelength 17. That is to say the output light 33 of the pass wavelength 17 is transmitted through the optical filter 1, whereas the entrance intensity $I_o$ is smaller than the output intensity $I_1$.

Light 13 of a wavelength 15 not being the pass wavelength 17 is not transmitted through the optical filter 1.

Figure 2B:
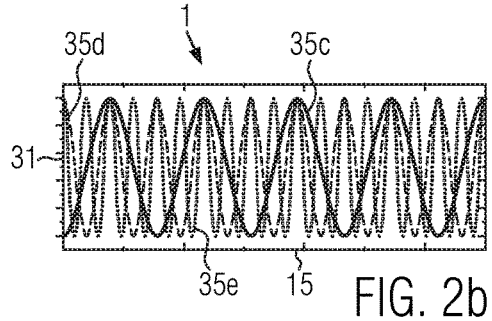
FIGS. 2a-2c show individual transmission characteristics of the optical filter stages and a resulting overall transmission characteristic of the optical filter.
Figure 2C:
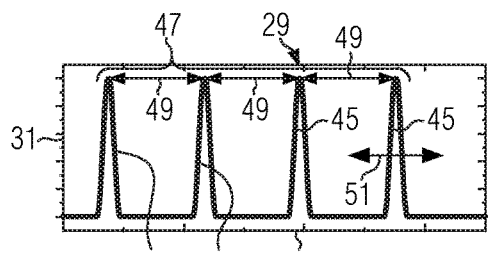
Figure 2A:
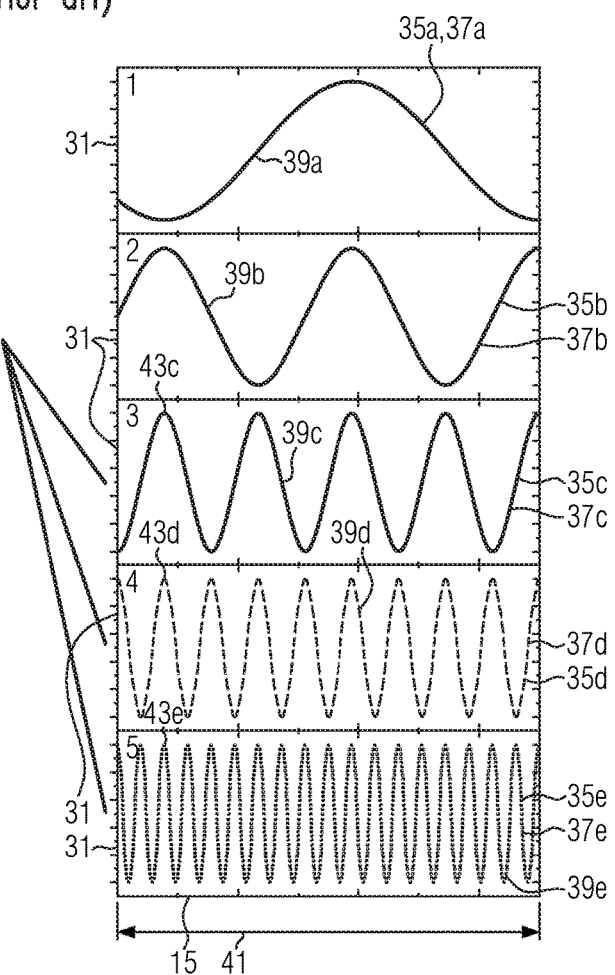

In FIGS. 2a, 2b and 2c, different transmission characteristics 35 are shown. FIG. 2a shows five transmission characteristics 35 of the six optical filter stages of FIG. 1, whereas the upper panel labeled with 1 denotes the transmission characteristic 35 of the optical filter stage 3 arranged on the left, i.e. next to the overall entrance polarizing element 5a of FIG. 1. The sixth transmission characteristic 35 of the objective filter stage 3 adjacent to the overall outward polarizing element 6a is not shown in FIG. 2a.

The transmission characteristics 35 shown plot the transmissivity 31 of the corresponding optical filter stage 3 versus the wavelength 15, wherein the transmission characteristics 35 are shown within a working wavelength range 41.

The figure shows that the different crystal thicknesses 9 result in different retardations 37a-37e, wherein the retardations 37a-37e are chosen such that a spectral frequency of the second filter stage 39b is twice a spectral frequency of the first filter stage 39a, correspondingly a spectral frequency of the third filter stage 39c is twice the value of the spectral frequency of the second filter stage 39b and so on.

The inventive optical filter 1 combines the transmission characteristic 35c, 35d and 35e, wherein the transmission characteristic 35c is plotted with a solid line, transmission characteristic 35d is plotted with a dashed line and transmission characteristic 35e with a dotted line.

In the inventive optical filter 1, which is schematically described with FIGS. 2a-2c, the optical filter stages 3 with transmission characteristics 35a and 35b are omitted and solely the optical filter stages 3 with transmission characteristics 35c-35e contribute to the overall transmission characteristic 29 which is shown in FIG. 2c. Plots of FIG. 2b and FIG. 2c also show the transmissivity 31 plotted over wavelength 15 within the working wavelength range 41.

In FIG. 2b, it can be seen that transmission peaks 43c, 43d and 43e, as well as nine other peaks in the transmission characteristics 35c-35e overlap with each other. The overlapping peaks 43c, 43d and 43e form a spectral passband 45a.

Similarly, nine overlapping peaks not labeled in FIG. 2a result in three other passbands 45 such that the overall transmission characteristic 29 of the optical filter 1 comprises four spectral passbands 45.

The spectral passbands 45 of the optical filter 1 form a spectral comb 47 characterized by the four identical spectral passbands 45 which are equidistantly spaced from each other with a spectral spacing 49.

If variable retarding elements 19 (see FIG. 1) are applied in the inventive optical filter, the whole spectral comb 47 may be spectrally shifted along a shift direction 51 shown in FIG. 2c.

Figure 3:
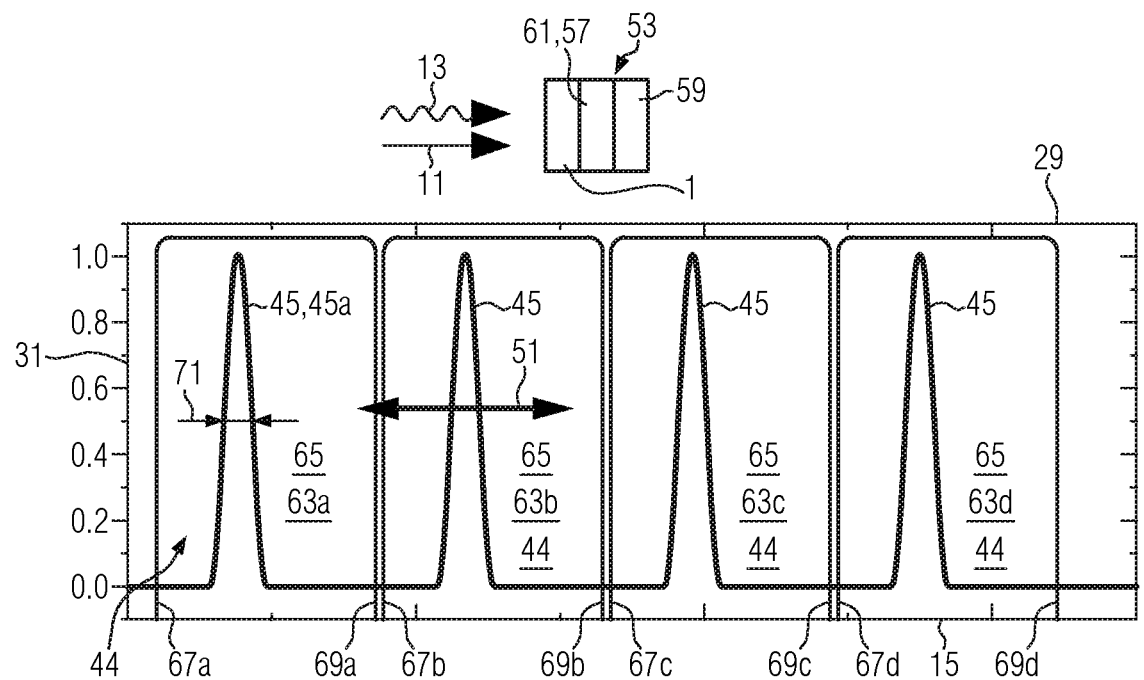
FIG. 3 shows a working principle of a camera for simultaneously capturing at least two images applying the inventive optical filter.

FIG. 3 shows a schematic working principle of a camera 53, wherein the camera 53 comprises a color filter 57, the inventive optical filter 1 and an image sensor 59. The Image sensor 59 may be embodied as a CMOS or as a CCD.

Light 13 is incident on the camera 53 along the transmission direction 11.

The larger panel of FIG. 3 is a schematic of the working principle of said camera 53 plotting the transmissivity 31 versus wavelength 15. The overall transmission characteristic 29 plotted in FIG. 3 comprises the spectral comb 47 which comprises the four spectral passbands 45.

The color filter 57 comprises four microfilters 61, each of which is positioned in front of a subset of all pixels (not shown) of the image sensor 59. In particular, each microfilter 61 is positioned in front of one single pixel. The wording in front is to be understood as a position between the optical filter 1 and the image sensor 59.

A plurality of microfilters 61 may be applied in a pattern to a corresponding multitude of pixels of the image sensor 59.

The plot of the transmissivity 31 indicates four microfilter characteristics 63a-63d, wherein each microfilter characteristic 63a-63d corresponds to a bandpass filter 65.

The bandpass filters 65 are characterized by a lower limit wavelength 67a-67d and an upper limit wavelength 69a-69d which form a spectral band 44. In the plot, the upper limit wavelength 69a and lower limit wavelength 67b are chosen such that microfilter characteristic 63a does not overlap with microfilter characteristic 63b. In other embodiments, said characteristics 63a-63d may show a minor overlap.

Therefore, only one of the spectral passbands 45 is spectrally located within one microfilter characteristic 63a-63b. As the light 13 is composed of all four spectral passbands 45, all four passbands 45 will be incident on each of the microfilters 61. However, each microfilter 61 will block the three spectral passbands 45 which are not spectrally located within the corresponding microfilter characteristic 63a-63d.

Consequently, if a multitude of pixels, preferentially arranged in a pattern, are provided with the microfilters 61, images may be captured, wherein each image is limited to one single spectral passband 45.

The spectral image captured thus only considers light of a wavelength within the bandwidth 71 of the corresponding spectral passband 45.

The bandwidth 71 is only shown for the spectral passband 45a and is given as a full width at half maximum bandwidth (FWHM), but may be determined differently in other embodiments of the invention.

Figure 4:
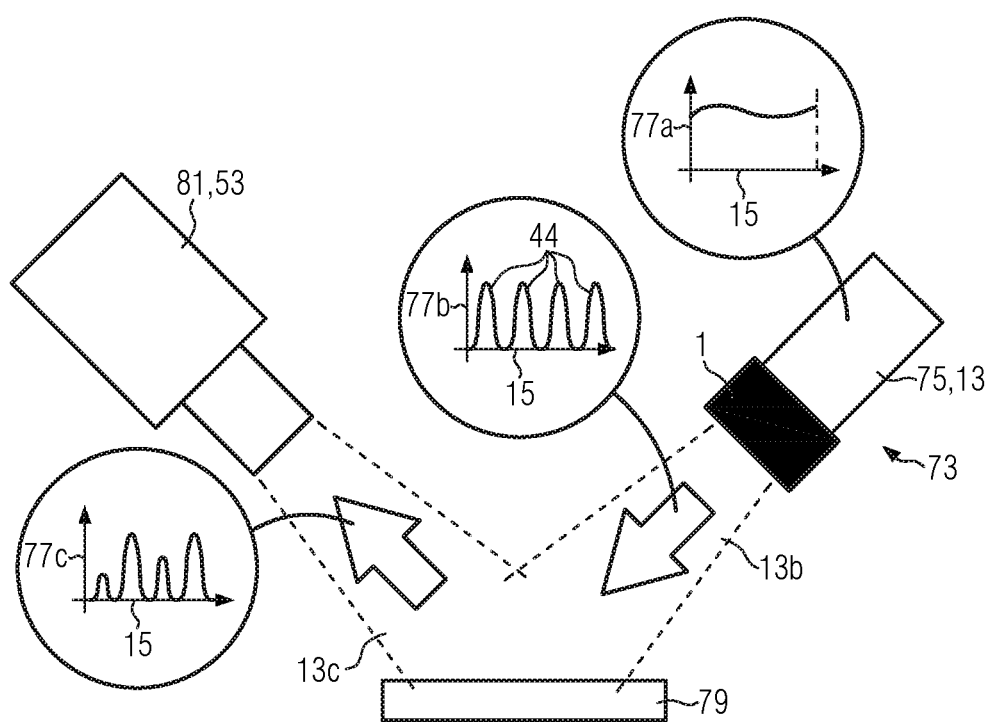
FIG. 4 shows the working principle of an inventive illumination system applying the optical filter.

FIG. 4 shows a schematic set-up of an inventive illumination system 73, which comprises a broadband light source 75 and the optical filter 1.

The broadband light source 75 may be embodied as a continuous light source 75a or a discrete broadband light source (not shown). The broadband light source 75 shown in FIG. 4, is a continuous broadband light source 75a. The continuous broadband light source 75a emits light 13 with an intensity distribution 77a.

The intensity distribution of the light source 77a is incident on the optical filter 1 and filtered according to the overall transmission characteristic 29 of FIG. 3 resulting in an intensity distribution after filtering 77b. The intensity distribution after filtering 77b comprises four spectral bands 44 that correspond to the spectral passbands 45 of the optical filter 1.

Filtered light 13b has the intensity distribution after filtering 77b and is incident on a sample 79. The sample 79 is reflective, wherein the degree of reflection depends on the wavelength incident on the sample 79. Therefore, reflected light 13c shows an intensity distribution after reflection 77c which is different from the intensity distribution after filtering 77b as several spectral features are attenuated.

The reflected light 13c is subsequently captured by a detection system 81 which may be embodied as a camera 53.

Due to the possibility to shift the spectral comb 47 of the overall transmission characteristic 29, the sample 79 of FIG. 4 may be illuminated at different wavelengths 15, wherein in the embodiment shown, the sample 79 is illuminated with four wavelengths simultaneously in real time.

Figure 5:
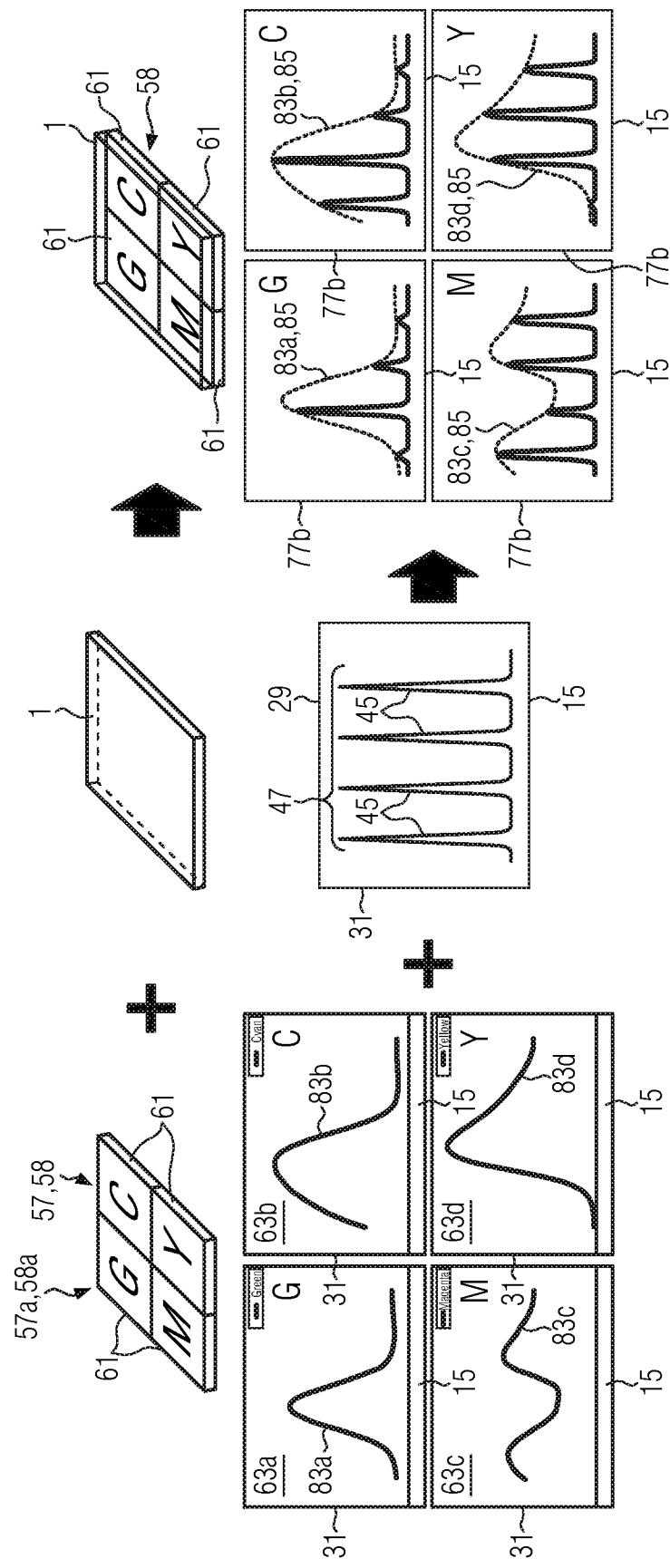
FIG. 5 shows the detailed working principle of the inventive camera.

FIG. 5 shows a schematic working principle of a second embodiment of the inventive camera.

FIG. 5 shows a color filter 57 which is embodied as a green-cyan-magenta-yellow (GCMY) filter 58 characterized by four microfilters 61. The embodiment of the GCMY filter 58 shown in FIG. 5 comprises a color coding 57a which is a GCMY color coding 58a.

Accordingly, a different embodiment of the color filter 57 (not shown) may be embodied as a red-green-blue (RGB) filter 60 (not shown) with a RGB color coding 60a (not shown)

The microfilters 61 are in contrast to the microfilters 61 shown in FIG. 3, not embodied as bandpass filters 65. The microfilters 61 of the GCMY filter 58 are rather characterized by microfilter characteristics 63a-63d showing specific transmission curves 83a-83d, describing the transmissivity 31 of the microfilters 61 dependent on the wavelength 15.

If such a GCMY filter 58 is combined with the inventive optical filter 1 having the overall transmission characteristic 29, each microfilter 61 of the GCMY filter 58 transmits all four spectral passbands 45 provided by the optical filter 1. The intensity distribution after filtering 77b plotted versus wavelength 15 is characterized by a multiplication of the corresponding microfilter characteristic 63a-63d of the GCMY filter 58 with the spectral comb 47 provided by the optical filter 1.

The transmission curves 83a-83d of the microfilters 61 therefore act as an envelope function 85 for the spectral comb 47.

Figure 6:
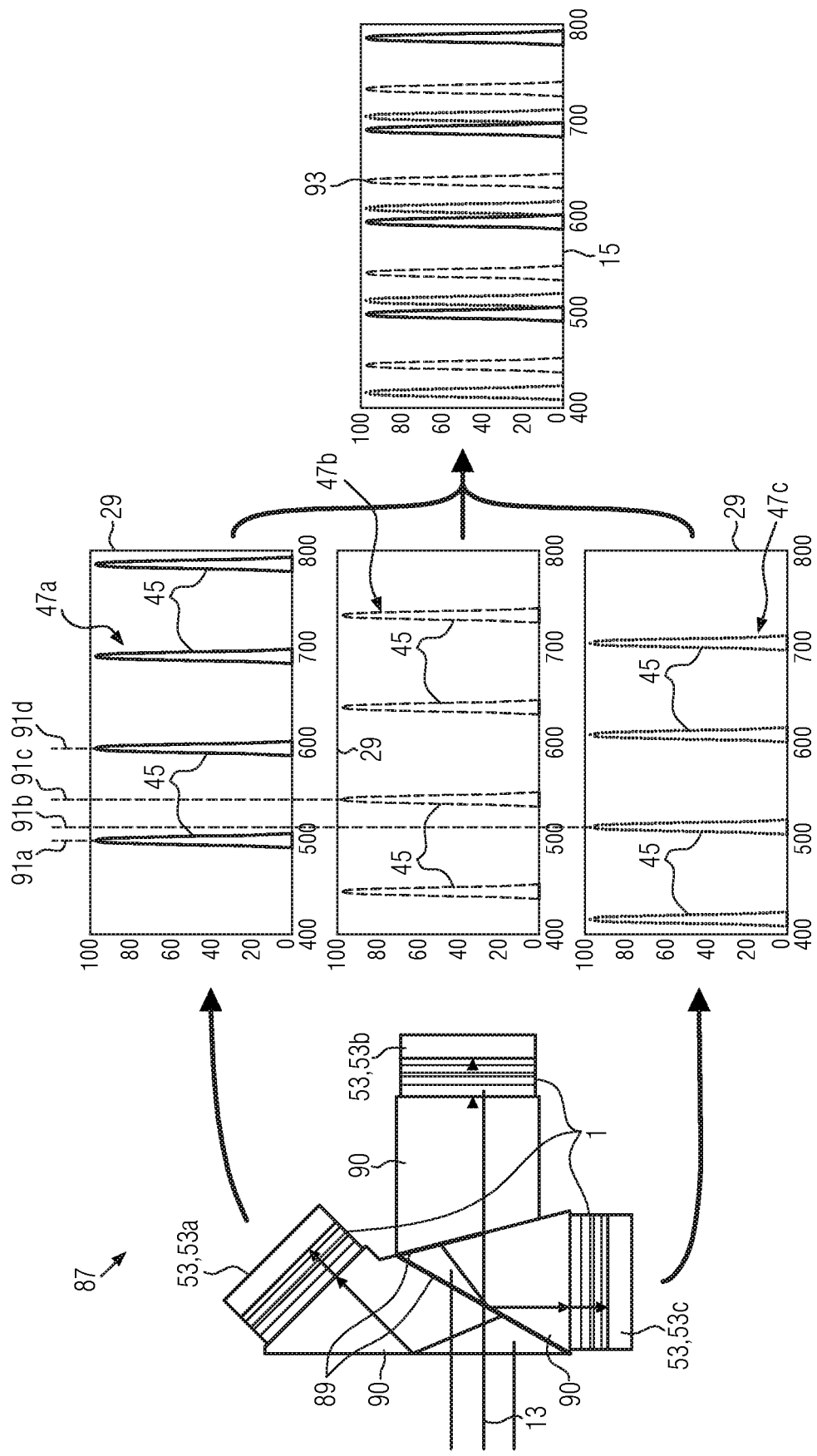
FIG. 6 shows the working principle of an inventive multi-spectral imaging system.

FIG. 6 shows a schematic working principle of an inventive multi-spectral imaging system 87 as well as a simplified set-up thereof.

The multi-spectral imaging system 87 comprises polychroic mirrors 89 which reflect light 13 incident on the multi-spectral imaging system 87.

The polychroic mirrors 89 have a reflection characteristic (not shown) having at least three spectral regions of different reflectivity, wherein the spectral regions of different reflectivity alternate along the wavelength axis. (In contrast to a dichroic mirror comprising a band edge separating a highly reflective spectral band and a non-reflecting spectral band).

The polychroic mirrors 89 are located at interfaces between three prism elements 90 and reflect the light 13 towards three cameras 53, which are provided with an optical filter 1 each.

The optical filters 1 are embodied tunable such that a first camera 53a is illuminated with a first spectral comb 47a, a second camera 53b is illuminated with a second spectral comb 47b, and a third camera 53c is illuminated with a third spectral comb 47c.

FIG. 6 shows that independent of the shift of the spectral comb 47a-47c, the individual spectral passbands 45 are equidistantly spaced from each other in each optical filter's 1 overall transmission characteristic 29. Therefore, the spectral passbands 45 cannot be selected independently.

It may be desired to perform a multi-spectral detection or imaging in real time at four measurement wavelengths 91a-91d (indicated in the plot of the overall transmission characteristic 29 of the first spectral comb 47a). As the measurements wavelengths 91a-91b are not equidistantly-spaced to each other, one spectral comb 47 does not allow detection of all measurement wavelengths 91a-91b in real time.

Therefore, by application of the second camera 53b with the second spectral comb 47b, the measurement wavelength 91c may be detected, and by application of third camera 53c yielding the third spectral comb 47c, the measurement wavelengths 91b may be detected simultaneously with measurement wavelengths 91a and 91d.

The resulting overall sensitivity of the multi-spectral imaging system 93 is plotted versus wavelength 15 on the right hand side of FIG. 6. Said overall sensitivity of the multi-spectral imaging system 93 is one way to mitigate the limitation of the equidistant spacing between the spectral passbands. It allows for an independent selection of the spectral passbands 45 measured by each imaging sensor 59.

It is to be noted that FIG. 6 solely depicts a schematic working principle of the inventive multi-spectral imaging system 87, wherein additional optical elements may be required between the prism elements 90, the optical filters 1 and the camera 53 in a real set-up.

REFERENCE NUMERALS 1 optical filter
3 optical filter stage
4 polarizing element
5 entrance polarizing element
5a overall entrance polarizing element
6 output polarizing element
6a overall output polarizing element
7 constant retarding element
9 thickness 11 transmission direction
11b alternative transmission direction
13 light
13b filtered light
13c reflected light
15 wavelength
17 pass wavelength
19 variable retarding element
21 liquid crystal element
23 liquid crystal
25 glass plate
27 optically transmissive electrodes
29 overall transmission characteristic
31 transmissivity
$I_o$ entrance intensity
$I_1$ output intensity
33 output light
35 transmission characteristic
37a-37e retardation
39a spectral frequency of $1^{st}$ filter stage
39b spectral frequency of $2^{nd}$ filter stage
39c spectral frequency of $3^{rd}$ filter stage
39d spectral frequency of $4^{th}$ filter stage
39e spectral frequency of $5^{th}$ filter stage
41 working wavelength range
43c-43e peak
44 spectral band
45, 45a spectral passband
47 spectral comb
47a first spectral comb
47b second spectral comb
47c third spectral comb
49 spectral spacing
51 shift direction
53 camera
53a first camera
53b second camera
53c third camera
55 spectral band
57 color filter
57a color coding
58 GCMY filter
58a GCMY color coding
59 image sensor
60 RGB filter
60a RGB color coding
61 microfilter
63a-63d microfilter characteristic
65 band pass filter
67a-67d lower limit wavelength
69a-69d upper limit wavelength
71 bandwidth
73 illumination system
75 broadband light source
75a continuous broadband light source
77a intensity distribution of the light source
77b intensity distribution after filtering
77c intensity distribution after reflection
79 sample
81 detection system
83a-83d transmission curve
85 envelope function
87 multi-spectral imaging system
89 polychroic mirror
90 prism element
91a-91d measurement wavelength
93 overall sensitivity of the multi-spectral imaging system

What is claimed is:

1. A camera (53) for simultaneously capturing at least two images, wherein each image is limited to light (13) in a different limited spectral band (44), wherein the camera (53) comprises an optical filter (1) having
an overall transmission characteristic (29) which comprises at least two spectral passbands (45, 45a) that are spectrally separated from each other; and
wherein at least one spectral passband (45) of the filter's overall transmission characteristic (29) is located in each of the different limited spectral bands (44);
wherein the camera further comprises a processor for post-processing for relating a measured intensity of each pixel to only one of the at least two spectral passbands (45, 45a).

2. The camera (53) according to claim 1, wherein the different limited spectral bands (44) correspond to a color coding (57a).

3. The camera (53) according to claim 2, wherein the color coding (57a) is an RGB (60a) color coding or a GCMY color coding (58a).

4. A multi-spectral imaging system (87) comprising at least one camera (53) according to claim 1 for simultaneous imaging.

5. The multi-spectral imaging system (87) according to claim 4, wherein the at least one camera comprises at least two cameras, and the at least two spectral passbands (45) of each of the at least two cameras (53) are spectrally shifted against each other.

6. The camera according to claim 1, wherein a working wavelength range of the optical filter (1) corresponds to a camera wavelength range within which the camera (53) detects incident light.

7. The camera according to claim 1, wherein the camera comprises a detector having a plurality of pixels, wherein each of the plurality of pixels comprises a microfilter (61).

8. The camera according to claim 7, wherein the microfilter (61) of each of the plurality of pixels is a bandpass filter (65).

9. The camera according to claim 8, wherein the spectral band (44) of a first of the microfilters (61) is spectrally adjacent to the spectral band (44) of a second of the microfilters (61).

10. The camera according to claim 7, wherein the microfilters (61) comprise a distinctive transmission spectrum, wherein the at least two spectral passbands (45, 45a) of the optical filter (1) experience different transmission values (31) for each of the microfilters (61).

11. An illumination system (73) for illuminating a sample (79) with light (13) of at least two different spectral bands (44), the illumination system (73) comprising a broadband light source (75) and an optical filter (1) arranged to filter light from the broadband light source (75), wherein the optical filter (1) having an overall transmission characteristic (29) which comprises at least two spectral passbands (45, 45a) that are spectrally separated from each other, wherein the at least two different spectral bands (44) correspond to the at least two spectral passbands (45, 45a).

* * * * *